US010360114B2

(12) United States Patent
Chou et al.

(10) Patent No.: US 10,360,114 B2
(45) Date of Patent: Jul. 23, 2019

(54) HARDWARE RECOVERY SYSTEMS

(71) Applicant: Quanta Computer Inc., Taoyuan (TW)

(72) Inventors: Le-Sheng Chou, Taoyuan (TW);
Wei-Yu Chien, Taoyuan (TW)

(73) Assignee: QUANTA COMPUTER INC.,
Taoyuan (TW)

( * ) Notice: Subject to any disclaimer, the term of this patent is extended or adjusted under 35 U.S.C. 154(b) by 137 days.

(21) Appl. No.: 15/052,430

(22) Filed: Feb. 24, 2016

(65) Prior Publication Data

US 2017/0242758 A1 Aug. 24, 2017

(51) Int. Cl.
*G06F 11/00* (2006.01)
*G06F 11/14* (2006.01)
(Continued)

(52) U.S. Cl.
CPC ........ *G06F 11/1484* (2013.01); *G06F 1/3287* (2013.01); *G06F 9/45558* (2013.01);
(Continued)

(58) Field of Classification Search
CPC ........ G06F 1/3246; G06F 1/325; G06F 1/266; G06F 1/3203; G06F 11/0709; G06F 11/0757; G06F 11/0793; G06F 13/4221; Y10T 307/406; Y10T 307/469; Y10T 307/729
See application file for complete search history.

(56) References Cited

U.S. PATENT DOCUMENTS 4,747,041 A * 5/1988 Engel .................... G06F 1/3203
307/29
5,560,022 A * 9/1996 Dunstan ................ G06F 1/3203
710/301
(Continued)

FOREIGN PATENT DOCUMENTS

TW 200504497 A 2/2005

OTHER PUBLICATIONS

Hewlett-Packard, "Advanced COnfiguration and Power Interface Specification Rev. 3.0b", Oct. 10, 2006, pp. 1-631.*
(Continued)

*Primary Examiner* — Bryce P Bonzo
*Assistant Examiner* — Jeison C Arcos
(74) *Attorney, Agent, or Firm* — Nixon Peabody LLP; Zhou Lu

(57) ABSTRACT

Systems, methods, and computer-readable storage media for hardware recovery are disclosed. In some examples, a system can detect a hardware error and identify a system component associated with the hardware error. The system can then generate a request configured to trigger an operating system of the system to place the system in a particular operating state. The particular operating state can be determined based on a component type of the system component. The particular operating state can be a first sleep state when the component type is a peripheral component or a second sleep state when the component type is a processor, a memory, or a power supply. The second sleep state can result
(Continued)

in a lower power resource consumption than the first sleep state. The system can generate an indication that the system component can be replaced without restarting the operating system.

18 Claims, 10 Drawing Sheets

(51) Int. Cl.
| | |
|---|---|
| *G06F 1/3287* | (2019.01) |
| *G06F 9/455* | (2018.01) |
| *G06F 11/22* | (2006.01) |
| *G06F 11/30* | (2006.01) |
| *G06F 11/07* | (2006.01) |

(52) U.S. Cl.
CPC ........ *G06F 11/076* (2013.01); *G06F 11/0712* (2013.01); *G06F 11/0793* (2013.01); *G06F 11/2289* (2013.01); *G06F 11/3062* (2013.01); *G06F 2009/45587* (2013.01); *G06F 2201/815* (2013.01); *Y02D 10/34* (2018.01)

(56) References Cited

U.S. PATENT DOCUMENTS

| | | | | |
|---|---|---|---|---|
| 6,363,452 | B1* | 3/2002 | Lach | G06F 13/4081 |
| | | | | 710/302 |
| 6,584,573 | B1* | 6/2003 | Wunderlich | G06F 1/1632 |
| | | | | 713/322 |
| 7,099,934 | B1* | 8/2006 | Ewing | G06F 1/26 |
| | | | | 307/11 |
| 7,934,121 | B2* | 4/2011 | Ritz | G06F 9/5077 |
| | | | | 714/11 |
| 2004/0148533 | A1* | 7/2004 | Nicholas | G06F 1/3203 |
| | | | | 713/320 |
| 2004/0225907 | A1* | 11/2004 | Jain | G06F 1/3203 |
| | | | | 713/320 |
| 2005/0015636 | A1* | 1/2005 | Chen | G06F 1/28 |
| | | | | 713/323 |
| 2005/0125703 | A1* | 6/2005 | Lefurgy | G06F 1/3203 |
| | | | | 713/320 |
| 2007/0011500 | A1* | 1/2007 | Dasari | G06F 11/0745 |
| | | | | 714/100 |
| 2007/0033315 | A1* | 2/2007 | Nguyen | G06F 13/4027 |
| | | | | 710/302 |
| 2008/0120518 | A1* | 5/2008 | Ritz | G06F 11/2025 |
| | | | | 714/3 |
| 2009/0055665 | A1* | 2/2009 | Maglione | G06F 1/206 |
| | | | | 713/320 |
| 2009/0119523 | A1* | 5/2009 | Totten | G06F 1/26 |
| | | | | 713/322 |
| 2010/0313072 | A1* | 12/2010 | Suffern | G06F 11/0793 |
| | | | | 714/37 |
| 2013/0159750 | A1* | 6/2013 | Branover | G06F 1/3203 |
| | | | | 713/323 |
| 2014/0032819 | A1* | 1/2014 | Dang | G06F 1/3225 |
| | | | | 711/103 |
| 2014/0281070 | A1* | 9/2014 | Natu | G06F 13/385 |
| | | | | 710/105 |

OTHER PUBLICATIONS

Thompson "PC Harwardware in a Nutshell 3rd" 2003, O'Reilly, p. 1-73 (Year: 2003).*

* cited by examiner

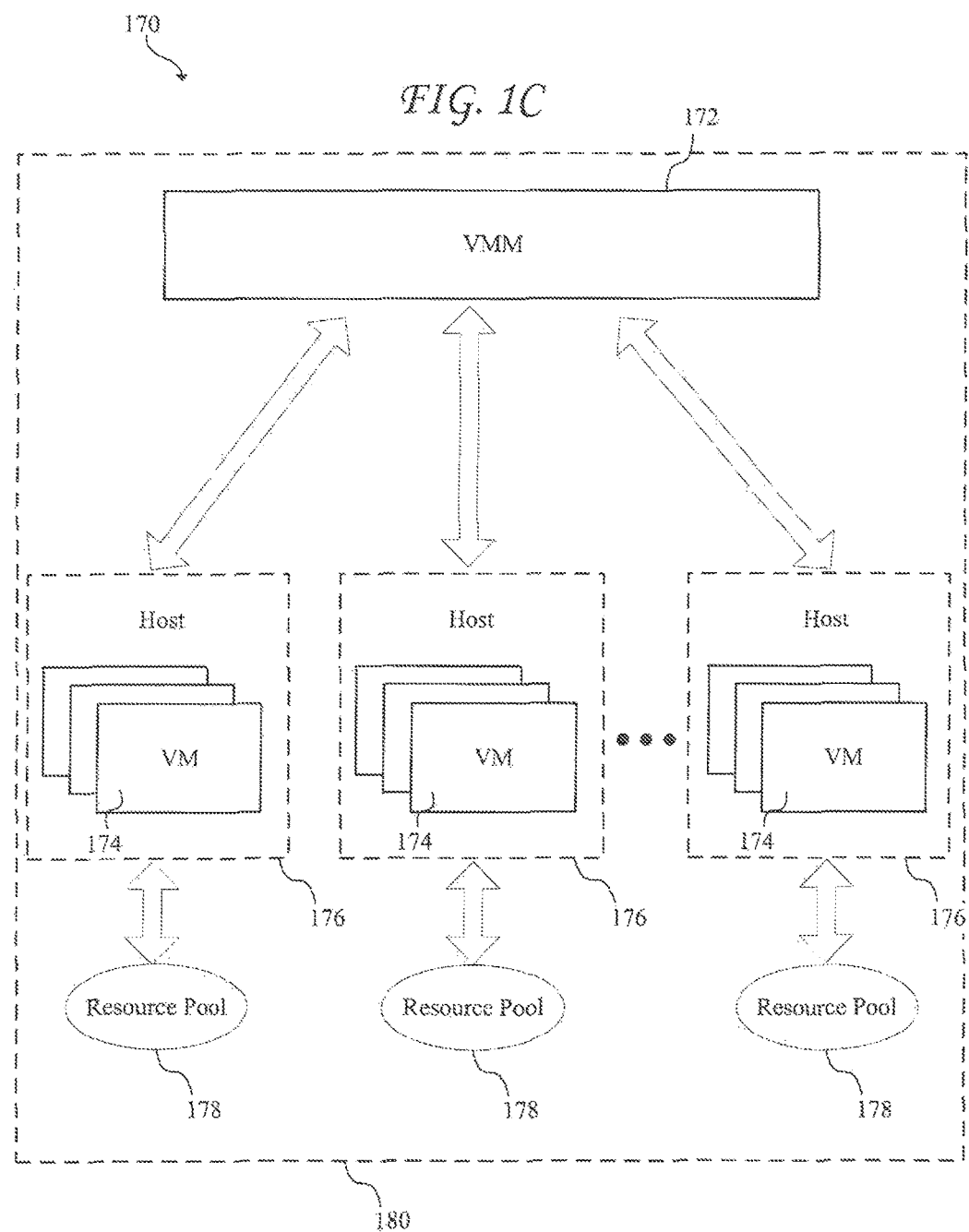

Figure 3:
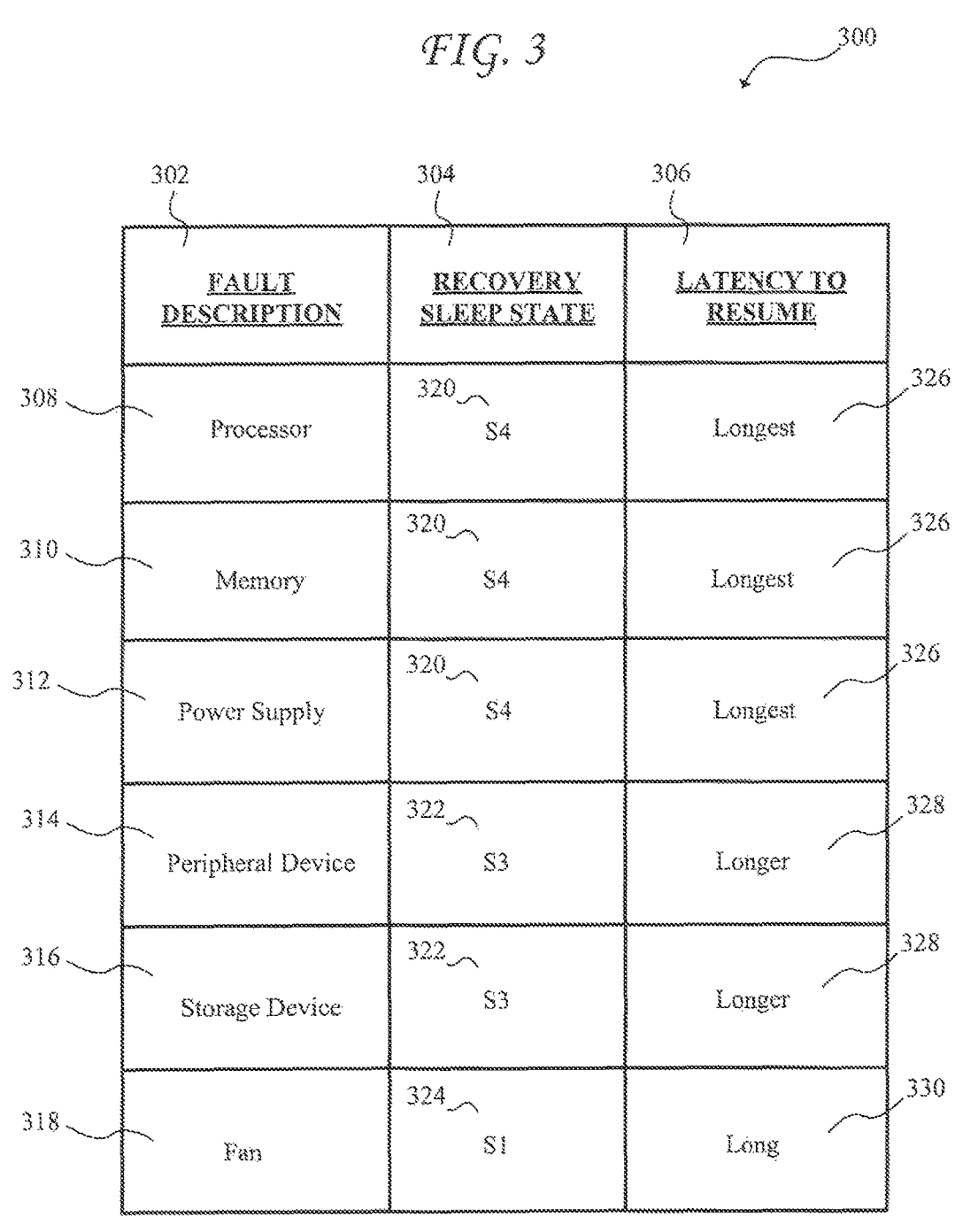

FIG. 3    300

| FAULT DESCRIPTION | RECOVERY SLEEP STATE | LATENCY TO RESUME |
|---|---|---|
| Processor | S4 | Longest |
| Memory | S4 | Longest |
| Power Supply | S4 | Longest |
| Peripheral Device | S3 | Longer |
| Storage Device | S3 | Longer |
| Fan | S1 | Long |

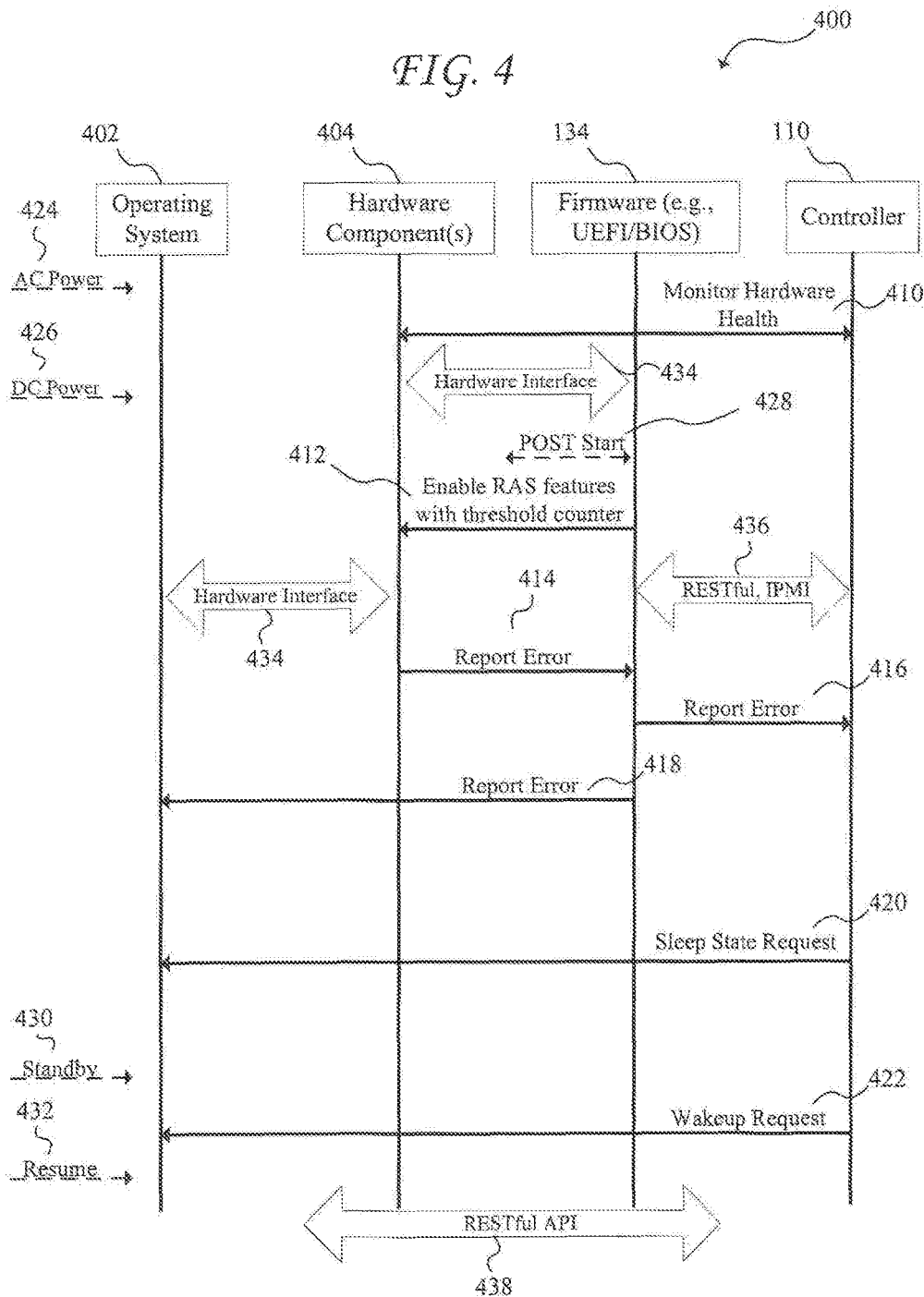

*FIG. 5*  500

| FEATURE | DESCRIPTION | PRIORITY |
|---|---|---|
| Fault Detection | - Obtain Error Notice;<br>-Identify fault severity, location, quantity. | High |
| Mitigation Plan (e.g., Extend uptime) | -Isolate the faulty resource from common pool;<br>-Reallocate new resource to VM;<br>-Close VM and migrate to different server. | High |
| VM Backup and Restore | -Backup VM data to prevent data loss;<br>-Restore VM data after server recovery. | Optional |

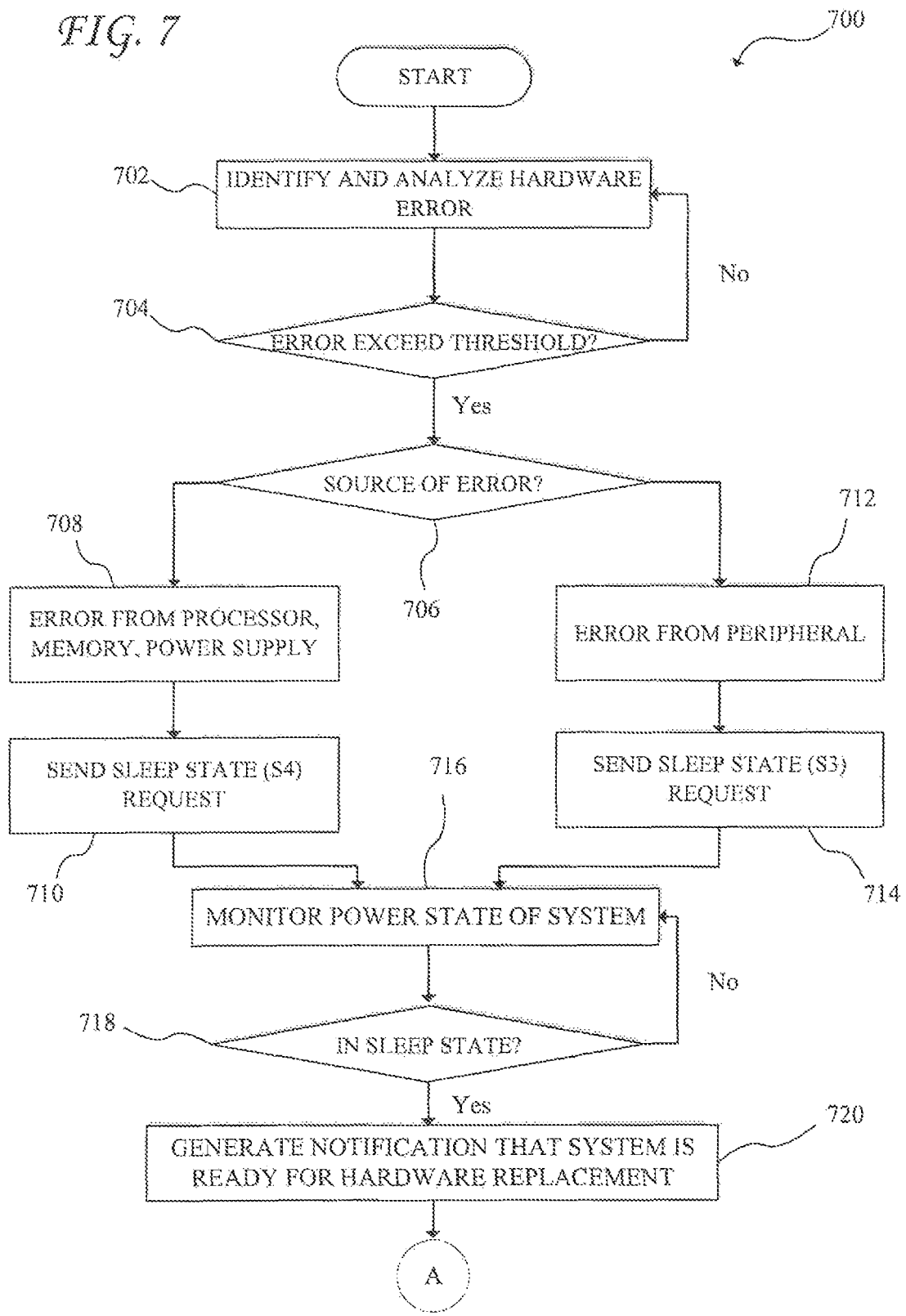

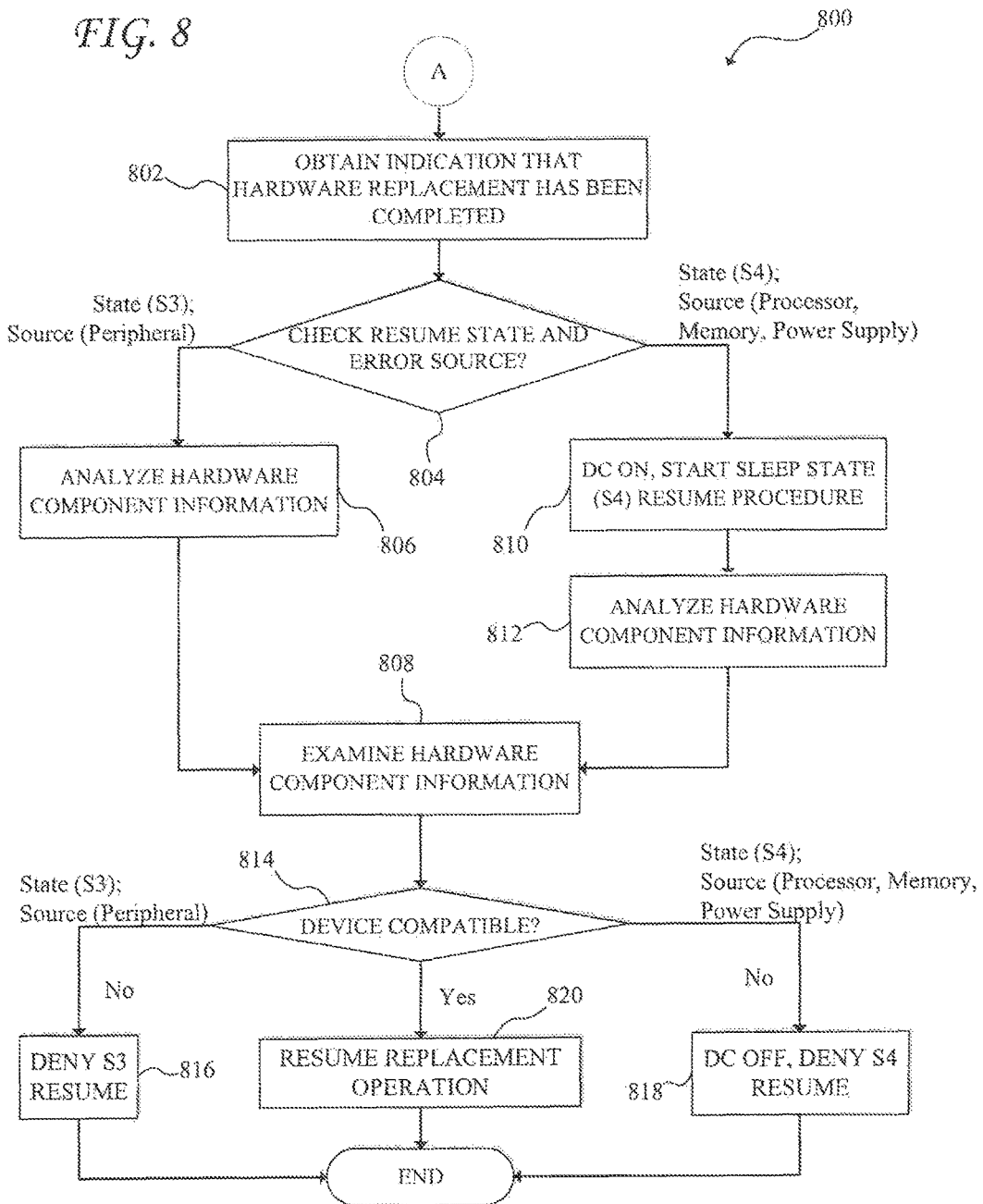

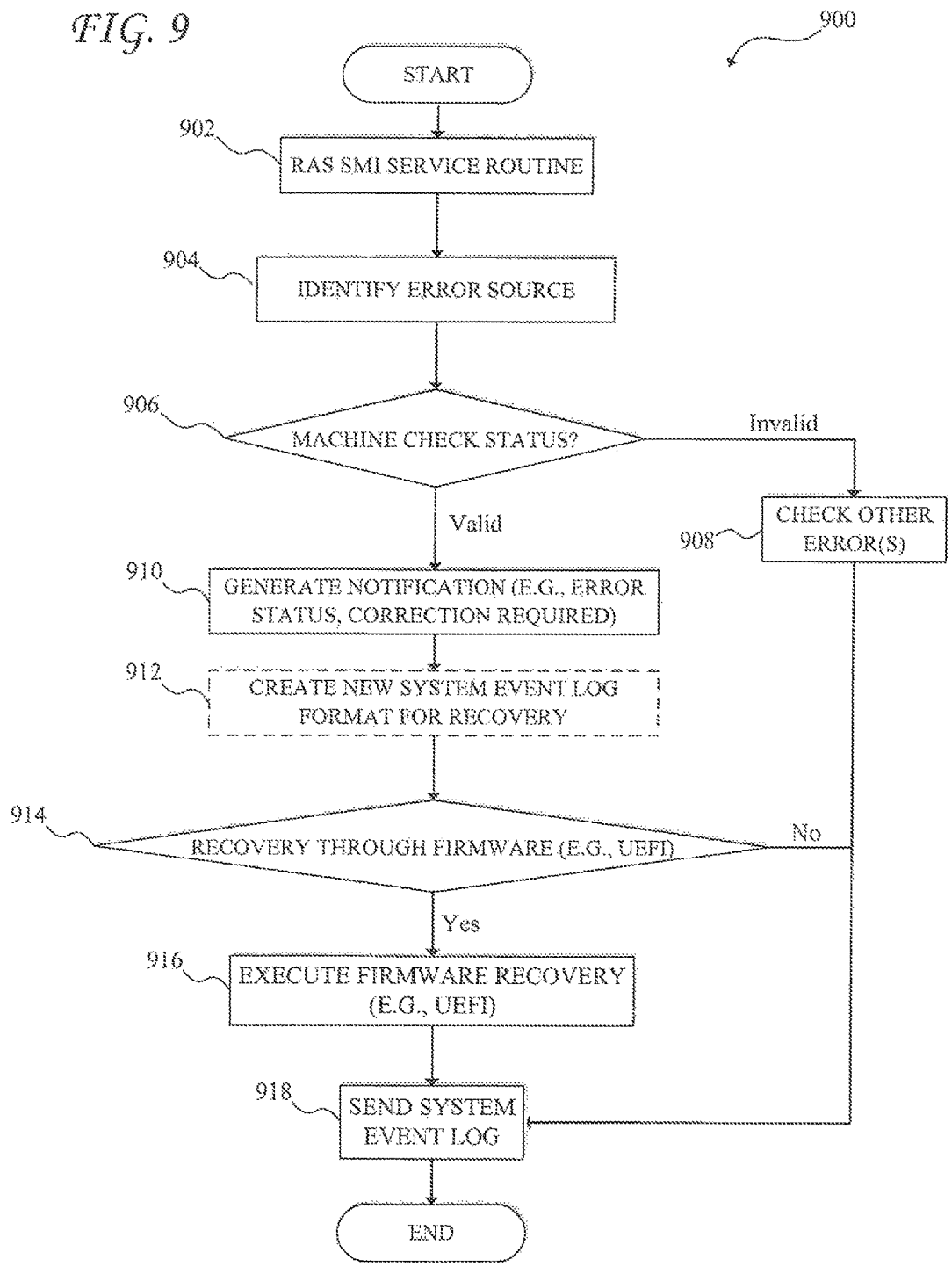

HARDWARE RECOVERY SYSTEMS

TECHNICAL FIELD

The present technology pertains to hardware recovery, and more specifically pertains to mechanisms for hardware recovery without hot-plug support.

BACKGROUND

The performance and processing capabilities of computers has shown tremendous and steady growth over the past few decades. Not surprisingly, computing systems, such as servers, are becoming more and more complex, often equipped with an increasing number and type of components, such as processors, memories, and add-on cards. Most experts agree this trend is set to continue far into the future.

However, with a growing number and complexity of hardware components, computing systems are increasingly vulnerable to device failures. Indeed, a device failure is a moderately common problem faced by system administrators, particularly in larger, more complex environments and architectures such as datacenters and rack scale architectures. Unfortunately, device failures can be very disruptive. For example, device failures can disrupt computing or network services for extended periods and, at times, may even result in data loss.

To correct a device failure, system administrators often have to perform a manual hardware recovery process. This hardware recovery process can include powering down a system or service to replace a failed system component. The overall recovery process can be inefficient and may result meaningful disruptions in service to the users. Moreover, the reliance on user input to complete certain steps of the recovery process can further delay the system's recovery and cause greater disruptions to users.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to replace faulty system components without hot-plug support. In particular, the approaches set forth herein can allow a faulty system component to be replaced without restarting or rebooting the system or requiring reconfiguration of the replacement system component. The system can be placed in a particular sleep state based on the type of fault and/or the type of component to be replaced. The particular sleep state can allow the system to continue to run while the component is replaced to avoid having to do a restart or reboot of the system. This mechanism can enable an efficient way to replace faulty components even, without hot-plug support, and minimize or limit system downtime.

Disclosed are systems, methods, and non-transitory computer-readable storage media for automatic hardware recovery. In some examples, a system can detect a hardware error and identify a system component (e.g., processor, memory, storage, power supply, peripheral, etc.) associated with the hardware error.

The system can then generate a sleep state request configured to trigger an operating system of the system to place the system in a particular sleep state. Thus, the system can cause the operating system to put the system in a particular sleep state in order to replace the hardware component associated with the hardware error. The particular sleep state can be determined based on a component type associated with the system component. For example, if the component type is a peripheral device (e.g., peripheral component interconnect express), the system can be placed in a deep sleep state to allow for the replacement of the peripheral without restarting the system. As another example, if the component type is a processor, a memory, or a power supply, the system can be placed in an even deeper sleep state that allows the system to run with minimal resources while the faulty component is replaced. Any level of sleep or other state is contemplated.

Thus, the particular sleep state can be a first sleep state, which can be a deep sleep state, when the component type is a peripheral component, and a second sleep state, which can be the deepest sleep state, when the component type is a processor, a memory, or a power supply unit. The second sleep state can result in a lower power resource consumption than the first sleep state and/or a longer resume latency than the first sleep state. The first sleep state can also be deeper than the second sleep state or both sleep states can be the same or substantially the same. Other combinations of states are also contemplated.

After the system has been placed in the particular sleep state, the system can generate an indication that the system component can be replaced without restarting the operating system of the system. The indication can be generated based on a determination that the system is in the particular sleep state corresponding to the component type associated with the system component, and/or the system is in a particular operating state, such as an operating state associated with a reduced use of resources, services, power, components, operating cycles, operating parameters, etc. Moreover, the indication can be generated when the system is ready for the component replacement. In other words, the indication can be generated based on a determination that the system is in a state that allows the specific component to be replaced to be replaced without restarting the system and/or operating system. As previously mentioned, the specific state that allows for component replacement without a system restart or reboot can depend based on the component type (e.g., peripheral, processor, memory, storage device, power supply, etc.).

Once the system is in a ready state, as determined based on the indication, the hardware component associated with the error can be replaced with a replacement hardware component. The replacement hardware component can be identical to the hardware component in terms of the type of component, the type of technical specifications, the associated driver(s) for running or configuring the component, the associated program(s) for running or configuring the component, the hardware or system requirements, the associated configurations, the brand, the model, the version, etc.

The replacement system component can be replaced while the system is in the particular sleep state without restarting/rebooting the system, without re-configuring the system component, without restarting an associated application, etc. Moreover, the system component can be replaced with the replacement system component even if the system, system component, and/or replacement system component do not support hot-plug or hot-swap technologies. After the system component has been replaced with the replacement system component, the system can transition from the particular sleep state to a normal operating state, and continue with normal operations. The system can then use the replacement system component in the same way it was able to use the system component prior to the error. As noted above, in each case where a "sleep" state is mentioned, it is contemplated that any other type of state could apply as well which would enable the replacement of the system component.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1C illustrates an example system for a virtualized environment;

FIG. 3 illustrates an example sleep state table;

FIG. 4 illustrates a diagram of example communications between various components for a hardware recovery or replacement procedure;

FIG. 5 illustrates an example fault recovery table for recovering resources and VMs by a virtual machine manager;

FIG. 7 illustrates a flowchart of an example method for monitoring and identifying hardware errors in a system;

FIG. 8 illustrates a flowchart of an example method for verifying a replacement system component; and FIG. 9 illustrates a flowchart of an example method for determining software recoverability.

DETAILED DESCRIPTION

Figure 1A:
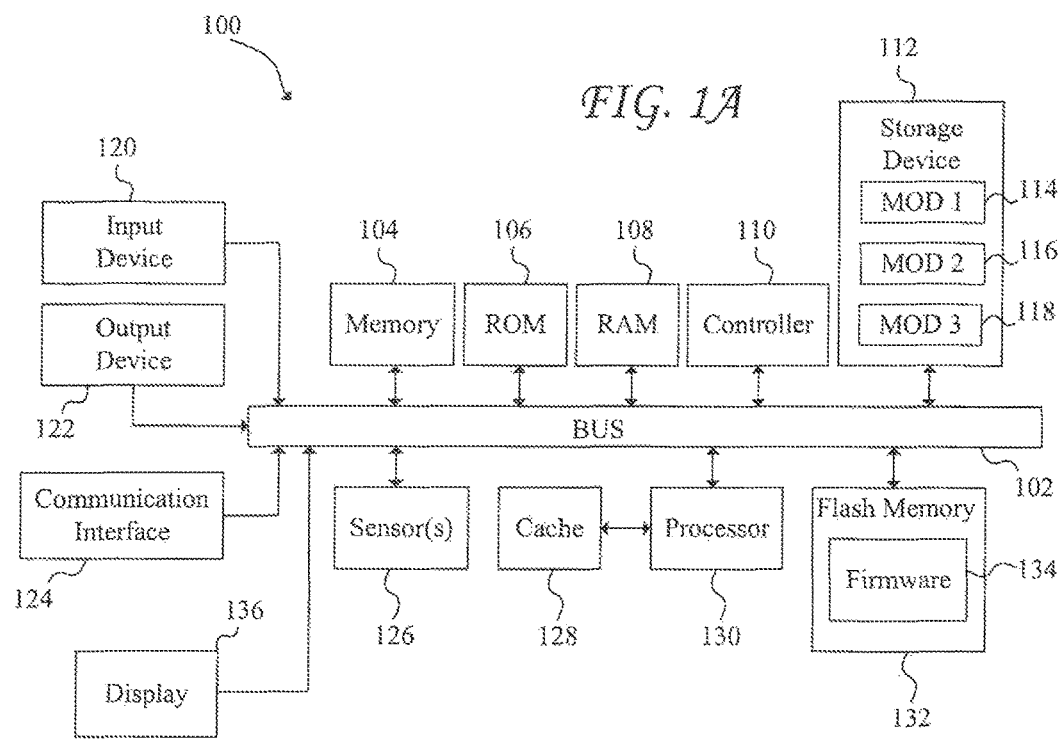
FIG. 1A illustrates a first example system embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The term "substantially" is defined to be essentially conforming to the particular element (e.g., requirement, component, characteristic, feature, state, etc.) or other word that modifies the element such that the element need not be exact. For example, an operating state can be substantially the same as a predefined sleep state if the operating state in functionally resembles the predefined sleep state, but can have one or more deviations from the predefined sleep state.

As used herein, a "sleep state" can refer to an operating state of a computing device, characterized by increased hardware latency, and/or reduced processing cycles, power state and/or consumption, resource use and/or allocation, activity, services, processes, memory allocations, computational tasks, processor clock, bus clocks, etc. For example, a "sleep state" can include a hibernation state, a hardware and/or software-defined (e.g., ACPI, OS, etc.) sleep state (e.g., states S1, S2, S3, and S4), an intermediate state, or a hybrid state (e.g., combination of a hibernation and sleep state). Moreover, when a computing system is in a "sleep state", in some cases, the computing device may retain at least part of the computing device's memory state and/or operating context in one or more storage or memory locations, which can be physical and/or virtual.

Disclosed are systems, methods, and non-transitory computer-readable storage media for hardware recovery systems. A brief introductory description of example systems and configurations for hardware recovery systems are first disclosed herein. A detailed description of hardware recovery mechanisms, including examples and variations, will then follow. These variations shall be described herein as the various embodiments are set forth. The disclosure now turns to FIGS. 1A and 1B.

Figure 1B:
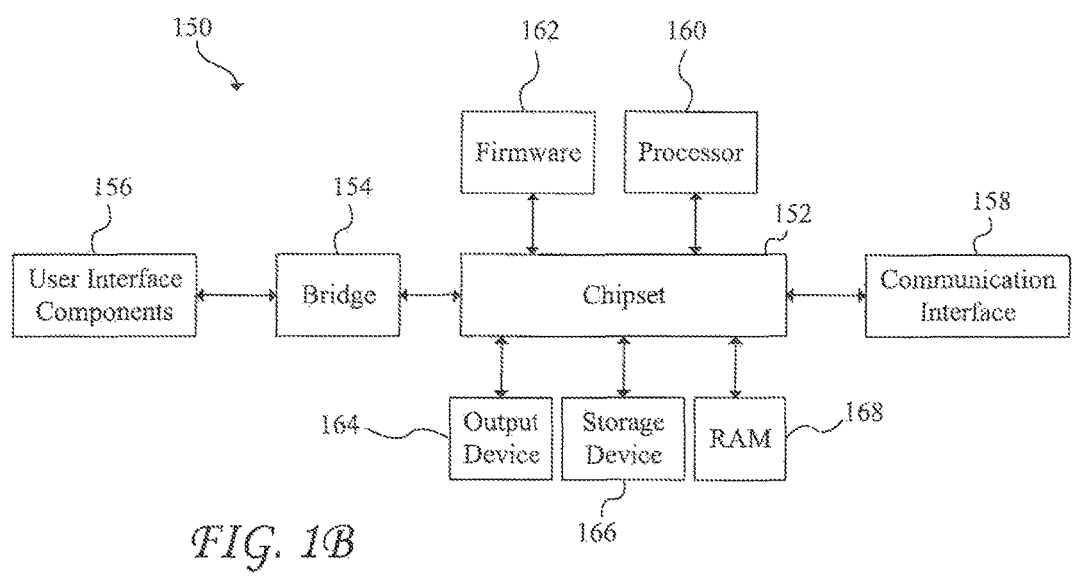
FIG. 1B illustrates a second example system embodiment.

FIGS. 1A and 1B illustrate example system embodiments. The more appropriate embodiment will be apparent to those of ordinary skill in the art when practicing the present technology. Persons of ordinary skill in the art will also readily appreciate that other system embodiments are possible.

FIG. 1A illustrates a system bus computing system architecture 100 wherein the components of the system are in electrical communication with each other using a bus 102. Example system 100 includes a processing unit (CPU or processor) 130 and a system bus 102 that couples various system components including the system memory 104, such as read only memory (ROM) 106 and random access memory (RAM) 108, to the processor 130. The system 100 can include a cache of high-speed memory connected directly with, in close proximity to, or integrated as part of the processor 130. The system 100 can copy data from the memory 104 and/or the storage device 112 to the cache 128 for quick access by the processor 130. In this way, the cache can provide a performance boost that avoids processor 130 delays while waiting for data. These and other modules can control or be configured to control the processor 130 to perform various actions. Other system memory 104 may be available for use as well. The memory 104 can include multiple different types of memory with different performance characteristics. The processor 130 can include any general purpose processor and a hardware module or software module, such as module 1 114, module 2 116, and module 3 118 stored in storage device 112, configured to control the processor 130 as well as a special-purpose processor where software instructions are incorporated into the actual processor design. The processor 130 may essentially be a completely self-contained computing system, containing multiple cores or processors, a bus, memory controller, cache, etc. A multi-core processor may be symmetric or asymmetric.

To enable user interaction with the computing device 100, an input device 120 can represent any number of input mechanisms, such as a microphone for speech, a touch-sensitive screen for gesture or graphical input, keyboard, mouse, motion input, speech and so forth. An output device 122 can also be one or more of a number of output mechanisms known to those of skill in the art. In some instances, multimodal systems can enable a user to provide multiple types of input to communicate with the computing device 100. The communications interface 124 can generally govern and manage the user input and system output. There is no restriction on operating on any particular hardware arrangement and therefore the basic features here may easily be substituted for improved hardware or firmware arrangements as they are developed.

Storage device 112 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 108, read only memory (ROM) 106, and hybrids thereof.

The storage device 112 can include software modules 114, 116, 118 for controlling the processor 110. Other hardware or software modules are contemplated. The storage device 112 can be connected to the system bus 102. In one aspect, a hardware module that performs a particular function can include the software component stored in a computer-readable medium in connection with the necessary hardware components, such as the processor 130, bus 102, display 136, and so forth, to carry out the function.

The controller 110 can be a specialized microcontroller or processor on the system 100, such as a BMC (baseboard management controller). In some cases, the controller 110 can be part of an Intelligent Platform Management Interface (IPMI). Moreover, in some cases, the controller 110 can be embedded on a motherboard or main circuit board of the system 100. The controller 110 can manage the interface between system management software and platform hardware. The controller 110 can also communicate with various system devices and components (internal and/or external), such as controllers or peripheral components, as further described below.

The controller 110 can generate specific responses to notifications, alerts, and/or events and communicate with remote devices or components (e.g., electronic mail message, network message, etc.), generate an instruction or command for automatic hardware recovery procedures, etc. An administrator can also remotely communicate with the controller 110 to initiate or conduct specific hardware recovery procedures or operations, as further described below.

Different types of sensors (e.g., sensors 126) on the system 100 can report to the controller 110 on parameters such as cooling fan speeds, power status, operating system (OS) status, hardware status, and so forth. The controller 110 can also include a system event log controller and/or storage for managing and maintaining events, alerts, and notifications received by the controller 110. For example, the controller 110 or a system event log controller can receive alerts or notifications from one or more devices and components and maintain the alerts or notifications in a system even log storage component.

Flash memory 132 can be an electronic non-volatile computer storage medium or chip which can be used by the system 100 for storage and/or data transfer. The flash memory 132 can be electrically erased and/or reprogrammed. Flash memory 132 can include erasable programmable read-only memory (EPROM), electrically erasable programmable read-only memory (EEPROM), ROM, NVRAM, or complementary metal-oxide semiconductor (CMOS), for example. The flash memory 132 can store the firmware 134 executed by the system 100 when the system 100 is first powered on, along with a set of configurations specified for the firmware 134. The flash memory 132 can also store configurations used by the firmware 134.

The firmware 134 can include a Basic Input/Output System or its successors or equivalents, such as an Extensible Firmware Interface (EFI) or Unified Extensible Firmware Interface (UEFI). The firmware 134 can be loaded and executed as a sequence program each time the system 100 is started. The firmware 134 can recognize, initialize, and test hardware present in the system 100 based on the set of configurations. The firmware 134 can perform a self-test, such as a Power-on-Self-Test (POST), on the system 100. This self-test can test functionality of various hardware components such as hard disk drives, optical reading devices, cooling devices, memory modules, expansion cards and the like. The firmware 134 can address and allocate an area in the memory 104, ROM 106, RAM 108, and/or storage device 112, to store an operating system (OS). The firmware 134 can load a boot loader and/or OS, and give control of the system 100 to the OS.

The firmware 134 of the system 100 can include a firmware configuration that defines how the firmware 134 controls various hardware components in the system 100. The firmware configuration can determine the order in which the various hardware components in the system 100 are started. The firmware 134 can provide an interface, such as an UEFI, that allows a variety of different parameters to be set, which can be different from parameters in a firmware default configuration. For example, a user (e.g., an administrator) can use the firmware 134 to specify clock and bus speeds, define what peripherals are attached to the system 100, set monitoring of health (e.g., fan speeds and CPU temperature limits), and/or provide a variety of other parameters that affect overall performance and power usage of the system 100.

While firmware 134 is illustrated as being stored in the flash memory 132, one of ordinary skill in the art will readily recognize that the firmware 134 can be stored in other memory components, such as memory 104 or ROM 106, for example. However, firmware 134 is illustrated as being stored in the flash memory 132 as a non-limiting example for explanation purposes.

System 100 can include one or more sensors 126. The one or more sensors 126 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 126 can communicate with the processor, cache 128, flash memory 132, communications interface 124, memory 104, ROM 106, RAM 108, controller 110, and storage device 112, via the bus 102, for example. The one or more sensors 126 can also communicate with other components in the system via one or more different means, such as inter-integrated circuit (I2C), general purpose output (GPO), and the like.

FIG. 1B illustrates an example computer system 150 having a chipset architecture that can be used in executing the described method(s) or operations, and generating and displaying a graphical user interface (GUI). Computer system 150 can include computer hardware, software, and firmware that can be used to implement the disclosed technology. System 150 can include a processor 160, representative of any number of physically and/or logically distinct resources capable of executing software, firmware, and hardware configured to perform identified computations. Processor 160 can communicate with a chipset 152 that can control input to and output from processor 160. In this example, chipset 152 outputs information to output 164, such as a display, and can read and write information to storage device 166, which can include magnetic media, and solid state media, for example. Chipset 152 can also read data from and write data to RAM 168. A bridge 154 for interfacing with a variety of user interface components 156 can be provided for interfacing with chipset 152. Such user interface components 156 can include a keyboard, a microphone, touch detection and processing circuitry, a pointing device, such as a mouse, and so on. In general, inputs to system 150 can come from any of a variety of sources, machine generated and/or human generated.

Chipset 152 can also interface with one or more communication interfaces 158 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 160 analyzing data stored in storage device 166 or RAM 168. Further, the machine can receive inputs from a user via user interface components 156 and execute appropriate functions, such as browsing functions by interpreting these inputs using processor 160.

Moreover, chipset 152 can also communicate with firmware 162, which can be executed by the computer system 150 when powering on. The firmware 162 can recognize, initialize, and test hardware present in the computer system 150 based on a set of firmware configurations. The firmware 162 can perform a self-test, such as a POST, on the system 150. The self-test can test functionality of the various hardware components 152-168. The firmware 162 can address and allocate an area in the memory 168 to store an OS. The firmware 162 can load a boot loader and/or OS, and give control of the system 150 to the OS. In some cases, the firmware 162 can communicate with the hardware components 152-160 and 164-168. Here, the firmware 162 can communicate with the hardware components 152-160 and 164-168 through the chipset 152 and/or through one or more other components. In some cases, the firmware 162 can communicate directly with the hardware components 152-160 and 164-168.

It can be appreciated that example systems 100 and 150 can have more than one processor (e.g., 130, 160) or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described herein.

FIG. 1C illustrates a schematic diagram of an example system for a virtualized environment 170. The virtualized environment 170 can include a virtual machine manager (VMM) 172 for managing virtual machines (VMs) 174. The VMM 172 allows users to create, edit, start, and stop VMs 174. The VMM 172 can also enable other functionalities for managing the VMs 174. For example, the VMM 172 allows a user or administrator to view and control the consoles of each of the VMs 174, see performance and utilization statistics for the VMs 174, vial all running VMs 174 and hosts 176 and their respective statistics, identify VM errors and faults, migrate workloads, etc.

The VMM 172 also allows users to configure and manage the virtualization hosts 176 for the VMs 174, manage and configure resources pool 178 and networking within the network or datacenter 180. The VMM 172 allows users to deploy VMs 174, migrate VMs or workloads, and manage and configure VMs 174, hosts 176, resources pool 178, etc.

The hosts 176 can each include one or more VMs 174. Moreover, the hosts 176 can include respective hypervisors for running the VMs 174. The hosts 176 can run a host operating system providing the software environment for the hosts 176, and each of the VMs 174 can run a guest operating system providing the software environment for the VMs 174.

The VMs 174 can be configured to use a resource pool 178 which can include the hardware resources used by the VMs 174 to create respective virtual hardware resources to support the VMs 174 and respective workloads. The resource pool 178 can include various types of hardware resources, such as processors, memory, storage devices, network interfaces, graphics processing units, input devices, output devices, etc. The hardware resources can be resources on the hosts 176. However, the hardware resources can also include other resources in the datacenter 180. For example, in datacenter based on a rack scale architecture, the resource pool 178 can include a pool of resources that may not necessarily be part of the hosts 176 and may include resources that, while capable of coupling with the hosts 176, may not be electrically coupled with the hosts 176.

The resource pool 178 can include multiple resources of the same type and/or extra resources for redundancy. For example, the resource pool 178 can include extra processors, memories, power supplies, fans, storage devices, peripherals, etc. This way, if a resource, such as a memory, used by a particular VM has a fatal error, the memory can be replaced with an extra memory in the resource pool 178 to allow for a quick recovery from the error.

Figure 2:
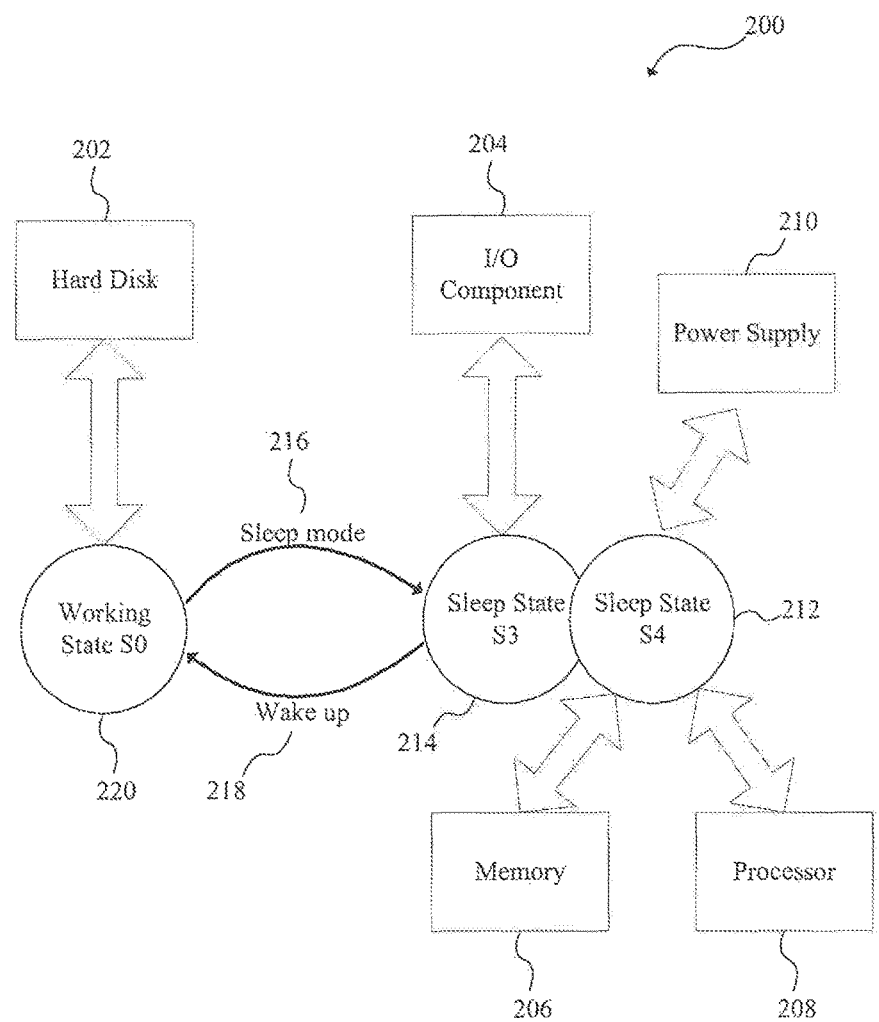
FIG. 2 illustrates a schematic diagram of an example system configured to implement a sleep state mechanism for replacing hardware components.

FIG. 2 illustrates a schematic diagram of an example system 200 configured to implement a sleep state mechanism 200 for replacing hardware components. The sleep state mechanism can be based on ACPI (advanced configuration and power interface) power management. For example, the system 200 can use ACPI to place the system 200 in a particular sleeping state so the user can replace a faulty component without restarting or rebooting the system 200. Once the user has replaced the faulty component, the system 200 can transition from the particular sleep state back to a working state without going through a reboot, reconfiguration, or redeployment of one or more applications.

For example, the hard disk device 202 can run in a working state (S0) 220. The S0 (220) can represent a normal operating state. If the system 200 determines it needs to replace a hardware component based on, for example, a detected hardware error or fault, the system 200 can perform a sleep mode transition 216 to place the system 200 on a sleep state. The sleep state can depend on one or more factors, such as the type of component to be replaced, the severity of the error or fault, etc. The sleep state can include sleep state S3 (214) and sleep state S4 (212).

Sleep state S3 (214) can be a deep sleep state where the system 200 can run with low power resource consumption. Moreover S3 (214) can have a long wake up latency for transitioning back to working state S0 (220). On the other hand, sleep state S4 (212) can be the deepest sleep state where the system 200 can run with the lowest power consumption. Given the deepest level of sleep of the S4 (212) sleep state, the wake up latency for the S4 (212) sleep state can be the longest latency of all the various sleep states.

As previously noted, the system 200 can transition from working state S0 (220) to sleep state S3 (214), S4 (212), or any other sleep state, based on the one or more factors noted above. For example, if the hardware error or fault is associated with a peripheral 204 (e.g., peripheral component interconnect express), the system 200 can transition to S3 (214) sleep state. While the system 200 is in the S3 (214) sleep state, a user can replace the peripheral component 204 with a replacement peripheral component. Once the peripheral component 204 has been replaced, the system 200 can perform a wake up transition 218, to resume the working state S0 (220).

If the hardware error or fault is associated with a memory 206, processor 208, a power supply unit 210, the system 200 can transition to S4 (212) sleep state, which can be the deepest sleep state. While the system 200 is in the S4 (212) sleep state, a user can replace the faulty memory 206, processor 208, or power supply unit 210, with a replacement component. Once the memory 206, processor 208, or power supply unit 210 has been replaced, the system 200 can perform a wake up transition 218, to resume the working state S0 (220). It is noted that the particular sleep state or other type of state can vary between a light sleep/other type of state or a deep state/another type of state.

In some configurations, the replacement component can be identical to the replaced component. For example, a replacement processor can be identical (e.g., same model, brand, etc.) to the replaced processor (e.g., processor 208). This can prevent any resource conflicts resulting from the replacement. Moreover, the system 200 can use the hardware replacement mechanism described herein to replace hardware components without the circuit or hardware, firmware, and/or drivers of the hot-plug design typically used in hot-swap or hot-plug hardware recovery mechanisms. The replacement component can also not be identical but sufficient to function as a replacement component. In one aspect, the kind or type of state that the system is transitioned to can depend on whether the replacement component is identical or simply compatible.

As one of ordinary skill in the art will recognize, the sleep state mechanism for hardware replacement can be implemented with more or less sleep states than those illustrated in FIG. 2. Indeed, the sleep states (S0, S3, S4) in FIG. 2 are non-limiting examples provided for clarity and explanation purposes. Other types of state can also be applied in various degrees. In addition, the present disclosure contemplates that other components and devices than those illustrated in FIG. 2 can also be replaced according to the principles described herein. In fact, the particular components or devices in FIG. 2 (e.g., peripheral component 204, memory 206, processor 208, and power supply unit 210) are presented herein as non-limiting examples for the sake of clarity and explanation purposes.

FIG. 3 illustrates an example sleep state table 300. The sleep state table 300 can include a column for the fault description 302, recovery sleep state 304 to implement, and latency to resume 306 associated with the particular sleep state defined in the recovery sleep state 304.

The fault description 302 can define the location or source of the fault or error. For example, the fault description 302 can define the location or source as being: the processor 308, the memory 310, the power supply 312, the peripheral device 314, the storage device 316, or the fan 318.

The recovery sleep state 304 can define the particular sleep state mapped to the corresponding component in the fault description 302. For example, the processor 308, memory 310, and power supply 312 can each be mapped to an S4 (320) sleep state. The peripheral device 314 and the storage device 316 can each be mapped to an S3 (322) sleep state. The fan 318 can be mapped to an S1 (324) sleep state.

The S4 (320) sleep state can have the lowest power resource consumption. The S3 (322) sleep state can have the next lowest power resource consumption, and the S1 (324) sleep state can have the highest power resource consumption. Each of these sleep states, can also have respective latency periods for resuming to working state or normal operating state.

The latency to resume 306 can indicate the relative latencies of the sleep states to resume working state or normal operating state. For example, the S1 (324) sleep state can have a long latency 330, the S3 (322) sleep state can have a longer latency 328, and the S4 (320) sleep state can have the longest latency 326. The relative latencies 326-330 can be at least partly based on the respective power resource consumption settings of each respective sleep state. For example, a lower power resource consumption typically results in a longer latency to resume working state.

The sleep state table 300 can include the various mappings of resources or faults to particular sleep states to use during a hardware replacement operation. The various resources or faults, sleep states, and latencies in the sleep state table 300 are non-limiting examples provided for clarity and explanation purposes. Accordingly, variations can be provided for different implementations, all of which are contemplated herein.

FIG. 4 illustrates a diagram of example communications 400 between various components for a hardware recovery or replacement procedure. The controller 110 can monitor 410 the health of hardware components 404 (e.g., memory 104, RAM 108, storage device 112, input device 120, output device 122, communications interface 124, sensor 126, processor 130, power supply unit, a fan, etc.). For example, the controller 110 can monitor the number of errors or faults associated with the hardware components 404, the severity of the errors or faults, the type of errors or faults, the recoverability of the errors or faults, the causality of the errors or faults, the performance consequences of the errors or faults, the location of the errors or faults, etc. The controller 110 can monitor the hardware components 404 during an AC power stage 424.

The system can transition from the AC power stage 424 to a DC power stage 426, and then start a Power-on-Self-Test (POST) 428 performed by the firmware 134 on the system, as described above with reference to FIGS. 1A and 1B.

After the POST start 428, the firmware 134 can enable an RAS (reliability, availability, and supportability) features 412, which can have a threshold counter. The RAS features 412 can identify errors or faults for a particular hardware component and maintain a count of errors or faults. The count can be used to determine if a hardware component replacement is necessary. For example, a threshold number of errors or faults of a component can trigger a replacement. The threshold can also vary based on one or more factors, such as the type of component, the type of error or fault (e.g., permanent, temporary, transient, intermittent, fatal, driver, conflict, etc.), the frequency of the error or fault, the severity of the error or fault, etc.

The hardware components 404 can report 414 an error encountered by the hardware components 404 to the firmware 134. The hardware components 404 can report the error via an interrupt service routine, such as a UEFI (Unified Extensible Firmware Interface) SMI (system management interrupt). The firmware 134 can then report 416 the error to the controller 110. The controller 110 can store the error in a system event log associated with the controller 110. The controller 110 can also report the error to an administrator or server. For example, the controller 110 can send an out-of-band (OOB) message to an administrator, to report the error.

The hardware components 404 can also report 418 the error to the OS 402. In some examples, the hardware components 404 can send the error to the OS 402 through an ACPI (Advanced Configuration and Power Interface) hardware error source table (HEST).

The controller 110 can also issue a sleep state request 420 to the OS 402. The controller 110 can send the sleep state request to the OS 402 via a service based on the REST (representational state transfer) architecture, such as a RESTful API. The sleep state request can specify a particular sleep state, such as S3 or S4 as previously discussed with respect to FIG. 3. The particular sleep state can be based on the specific location of the error or fault. For example, for errors or faults originating from a primary hardware component (e.g., processor, memory, power supply, etc.), the particular sleep state can be a deeper sleep state (i.e., a sleep state with lower power resource consumption). On the other hand, for errors or faults originating from peripherals, add-ons, or ancillary components (e.g., PCIe cards), the sleep state may not be as deep (i.e., a sleep state with low power resource consumptions but not the lowest power resource consumption).

When the OS 402 receives the sleep state request, it can notify a virtual machine manager (VMM) if the system is associated with a virtualized environment, such as virtualized environment 170 described above with reference to FIG. 1C. The OS 402 can also stop one or more applications and drivers, such as an application and driver associated with the error and/or faulty component, before entering the sleep state. The OS 402 can then place the system in standby 430 (i.e., sleep state) based on the sleep state request. The standby state can be according to a particular sleep state as previously mentioned.

During the standby 430 state, a user or administrator can replace the faulty component with a replacement component. The user or administrator can replace the faulty component without restarting or rebooting the OS 402. To avoid conflicts, the replacement component can be identical to the faulty component being replaced.

After the faulty component has been replaced, the controller 110 can issue a wakeup request 422 to the OS 402. The wakeup request can trigger the OS 402 to wakeup by transitioning from the standby state 430 to a working state (e.g., S0 as described above with reference to FIG. 2). The controller 110 can issue the wakeup request through a RESTful API, for example.

The OS 402 can receive the wakeup request and transition to a working or normal operating state. The OS 402 can also notify a VMM, for example if the system is associated with a virtualized environment, such as virtualized environment 170 described above with reference to FIG. 1C. Moreover, the OS 402 can restart any stopped applications or drivers after resuming from the standby state 430.

The communications 400 between the various components can be based on different types of services and/or interfaces. For example, the firmware 134 can communicate with the hardware components 404 through a hardware interface 434, such as a UEFI BIOS which can read a PCIe register through PCI Express extended configuration space flat memory-mapped access mechanism and read CPU IA32_MCi_Status through a CPU MSR instruction. Similarly, the hardware components 404 can communicate with the operating system (OS) 402 via a hardware interface 134. Moreover, the controller 110 can communicate with the firmware 134 via IPMI (Intelligent Platform Management Interface) or a service based on representational state transfer (REST), such as RESTful. Finally, the controller 110 can communicate with the OS 402 via a service based on the REST architecture, such as a RESTful API.

FIG. 5 illustrates an example fault recovery table 500 for recovering resources and VMs by a virtual machine manager (VMM) 172. The table 500 includes a feature column 502, a description column 504 and a priority rating column 506. The table 500 can specify a fault detection feature 508, a mitigation plan 510, and a VM backup and restore feature 512.

The fault detection feature 508 can include steps 514, which can include obtaining an error notice from the OS, and identify fault severity, location and quantity. The VMM 172 here can read an ACPI hardware error source table to identify the specific error and/or error details. Moreover, the fault detection feature 508 can be assigned a high priority 520.

The mitigation plan 510 can include steps 516, which can include isolating the faulty resource from the resource pool, reallocate the new resource to the VM, and close the VM and migrate to a different server. The mitigation plan 510 can be assigned a high priority 520.

The VM backup and restore feature 512 can include steps 518, which can include backing up VM data to prevent data loss, restoring VM data after the server or system is back to health (e.g., after recovery). The VM backup and restore feature 512 can be assigned an optional priority 522.

The various fields and elements in the table 500 are non-limiting examples provided for the sake of clarity and explanation. Other fields, elements, and details are also contemplated herein.

Having disclosed some basic system components and concepts, the disclosure now turns to the example method embodiments shown in FIGS. 6 through 9. For the sake of clarity, the methods are described in terms of system 100, as shown in FIG. 1A, configured to practice the various steps. The steps outlined herein are exemplary and can be implemented in any combination thereof, including combinations that exclude, add, or modify certain steps.

Figure 6:
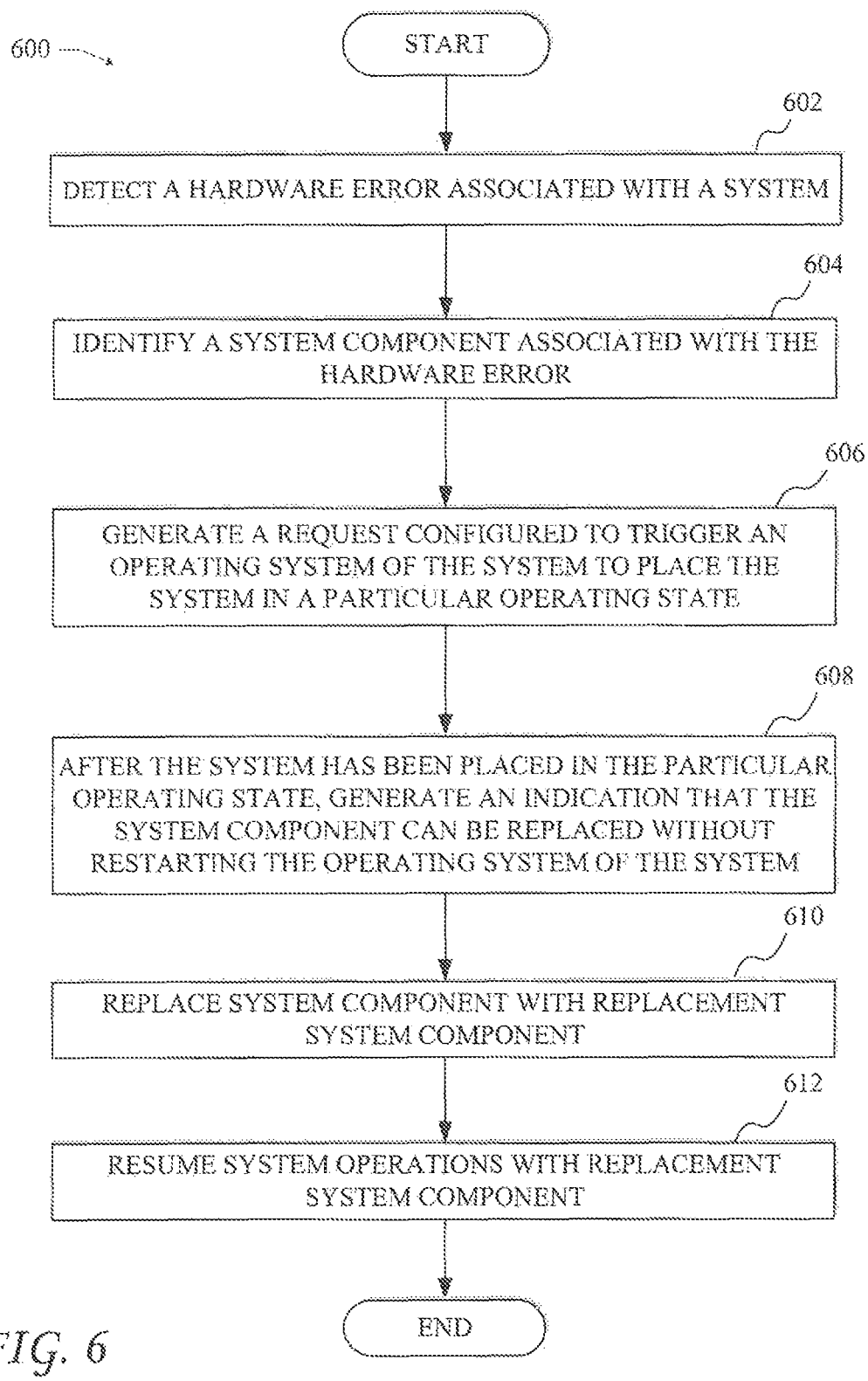
FIG. 6 illustrates an example method for performing a hardware recovery procedure.

FIG. 6 illustrates an example method 600 for performing a hardware recovery mechanism. At step 602, the system 100 can detect a hardware error associated with the system 100. The system 100 can detect the error via the controller 110. For example, the controller 110 can monitor the health of the hardware components of the system 100, such as the memory 105, RAM 108, storage device 112, input device 120, output device 122, communication interface 124, processor 130, fan (not shown), power supply (not shown), etc.

The system 100 can determine an error count associated with the hardware error. For example, the system 100 can determine a number of instances of the hardware error. The system 100 can also determine whether the error count exceeds an error threshold. The error threshold can be based on a predetermined number of errors or counts (e.g., N errors), a frequency of errors (e.g., N errors within Y period of time), a recovery period associated with the hardware error (e.g., it took N time units to recover from the hardware error), etc. Moreover, the system 100 can also determine the severity of the hardware error. For example, the system 100 can determine whether the error is a fatal or unrecoverable error, whether the hardware error can result in loss of data, whether the hardware error can result in disruptions (e.g., disruptions to the system component, the system 100, and/or a service), etc.

At step 604, the system 100 can identify a system component associated with the hardware error. The system 100 can identify the source or location of the hardware error. For example, the system 100 can determine that the error is from the processor 130. The system component can be, for example, a processor, a memory, a power supply unit, a storage device, a fan, a peripheral (e.g., PCI, PCIe, etc.), an add-on card, etc.

At step 606, the system 100 can generate a request configured to trigger an operating system of the system 100 to place the system 100 in a particular operating state (e.g., sleep state, hibernating state, etc.). The system 100 can generate the request via the controller 110, for example. Moreover, the controller 110 can transmit the request to the operating system to place the system 100 into the particular operating state.

The request can be generated based on a severity of the hardware error, an error count, or any other characteristic or statistic associated with the hardware error. For example, the request can be generated based on a determination that the hardware error is a fatal error and/or an error count exceeds an error threshold.

The particular operating state can be determined based on a component type of the system component associated with the error. For example, the particular operating state can be determined based on the identity of the system component associated with error (e.g., peripheral, processor, memory, power supply, fan, disk drive, etc.).

As previously noted, the particular operating state can vary based on the component type. For example, the particular operating state can be a first sleep state (e.g., S3 214) when the component type is a peripheral component, and a second sleep state (e.g., S4 212) when the component type is a processor, a memory, or a power supply unit. In this example, the second sleep state can be associated with a lower power resource consumption than the first sleep state and/or a longer resume latency than the first sleep state.

The operating system can receive the request and place the system 100 into the particular operating state. The operating system can also stop any drivers and/or applications associated with the system component.

At step 608, after the system 100 has been placed in the particular operating state, the system 100 (e.g., via the controller 110) can generate an indication that the system component can be replaced. The indication can indicate that the system component can be replaced without restarting the operating system of the system 100, installing drivers or software, reconfiguring the system component, shutting down the system 100, etc.

The indication can be generated based on a determination that the system 100 is in the particular operating state. As previously noted, the particular operating state can correspond to the operating state associated with the component type and/or suited for replacing the system component without shutting down or restarting the system 100.

At step 610, the system component can be replaced with a replacement system component. At step 612, once the system component has been replaced, the system 100 can resume operations with the replacement system component. The system 100 can resume operations according to a working or normal state of operation. The system 100 can resume normal operations using the replacement system component with minimal or limited disruption.

In some cases, prior to resuming a working or normal operating state, the system 100 can verify that the replacement system component is a compatible replacement for the system component. For example, the system 100 can collect hardware information associated with the system component and the replacement system component and compare the hardware information to determine if the hardware information from both components match or are substantially similar. The system 100 can also determine if the replacement system component is the same as the system component or substantially similar.

Moreover, in determining if the replacement system component is compatible, the system 100 can determine if the replacement system component is the same type as the system component, has the same hardware configuration, uses the same firmware and/or software driver, has the same resource requirements, etc. The system 100 can generate an indication based on the compatibility determination. For example, the system 100 can generate an indication that the replacement system component is or is not compatible.

If the replacement system component is compatible, the system 100 can finalize the replacement and resume operations. Alternatively, if the replacement system component is not compatible, the system 100 can deny the replacement or issue a warning.

If the system 100 is part of a virtualized environment (e.g., includes VMs, etc.), the system 100 can restore or migrate VM workloads as part of the replacement mechanism. For example, the system 100 can stop a VM workload and restore the VM workload on the system 100 after the replacement system component has been replaced and the system 100 has resumed, or is ready to resume, normal or working operations.

The system 100 can perform any of the steps of method 600 to replace the system component even if the system 100 does not have hot-plug hardware, circuitry, drivers, design, etc. For example, the system 100 can replace the system component with the replacement system component as described herein even if the system 100, the system component and/or the replacement system component do not support hot-plug operations.

FIG. 7 illustrates a flowchart of an example method 700 for monitoring and identifying hardware errors in a system. At step 702, the system 100 can identify and analyze a hardware error on the system 100. The hardware error can be an error or fault associated with a system component on the system. Moreover, the system 100 can monitor the hardware components to detect the hardware error when it occurs. Further, the system 100 can determine the status of the error, the severity of the error, (e.g., fatal, non-fatal, disruptive, permanent, temporary, etc.), the location of the error (e.g., the source component or driver), the error count (e.g., number of errors), etc.

At step 704, the system 100 can determine if the error exceeds an error threshold. If the error does not exceed a threshold, the system 100 returns to step 702. On the other hand, if the error exceeds the threshold, at step 706, the system checks the source of the error.

At step 708, the system 100 can determine if the error is from a processor, memory, or power supply. At step 710, the system 100 can then send a sleep state S4 request for placing the system 100 in a S4 sleep state. The S4 sleep state can be the deepest sleep state, characterized by the lowest power resource consumption.

At step 712, the system 100 can determine if the error is rather from a peripheral. Here, when the error is from a peripheral, at step 714, the system 100 sends a sleep state S3 request to place the system 100 in an S3 sleep state. The S3 sleep state can be a deep sleep state with low power resource consumption.

At step 716, the system 100 monitors the power state of the system 100 to ensure that the system 100 has entered the sleep state as expected in response to the sleep state request at step 710 or 714

At step 718, the system determines if the system 100 has entered the sleep state. If the system has not entered the sleep state, the system 100 returns to step 716 to monitor the power state. Alternatively, if the system 100 has entered the sleep state, at step 720, the system 100 then generates a notification that the system 100 is ready for the hardware replacement of the system component associated with the error. The user can then replace the system component once the system 100 is ready for such procedure.

FIG. 8 illustrates a flowchart of an example method 800 for verifying a replacement system component installed after method 700. At step 802, the system 100 can obtain an indication that the hardware replacement has been completed. At this point, the system component has been replaced with a replacement system component.

At step 804, the system 100 checks a resume state and error source. If the resume state is S3 and the error source is a peripheral, at step 806, the system 100 then analyzes the hardware component information (e.g., component type, component version, component requirements, component drivers, component identifier, etc.) of the replacement component.

On the other hand, if the resume state is S4 and the error source is a processor, a memory, or a power supply, at step 810, the system 100 ensures that DC power is on and initiates a sleep state S4 resume procedure. At step 812, the system 100 also analyzes the hardware component information of the replacement component.

After analyzing the hardware component information at step 806 or 812, at step 808 the system 100 examiners the hardware component information. For example, the controller 110 can review the hardware details associated with the replacement system component.

At step 814, the system 100 determines if the replacement system component is compatible for the replacement procedure. For example, the system 100 can determine if the replacement system component is identical to the system component replaced. If the replacement system component is identical, the system 100 can determine that the replacement system component is compatible. In some examples, the system 100 can also determine that the replacement system component is compatible if it has the same software (e.g., drivers), configuration, and/or system requirements as the system component replaced.

At step 820, if the replacement system component is compatible, the system 100 can resume the replacement operation and allow the OS to complete the replacement.

Alternatively, if the replacement system component is not compatible, at step 816 the system 100 can deny the S3 resume procedure if, at step 804, the resume state is S3 and the error source is a peripheral. On the other hand, if the replacement system component is not compatible, at step 818, the system 100 can turn DC power off and deny resume S4 procedure if, at step 804, the resume state is S4 and the error source is a processor, a memory, or a power supply.

FIG. 9 illustrates a flowchart of an example method 900 for determining software recoverability. At step 902, the system 100 can run an RAS (reliability, availability, serviceability) SMI (system management interrupt) service routine. An SMI can be initiated by UEFI BIOS to serve any kind of server hardware error occurring, collect information, and/or log as event for OS and/or controller (e.g., BMC). At step 904, the system 100 can then identify the error source.

At step 906, the system 100 can perform a machine check status. For example, the system 100 can examine IA32_Mci_Status. If the machine check status is invalid, at step 908 the system 100 can check other errors. At step 918, the system 100 can then send a system event log reporting any errors. The system 100 can send the system event log to the controller 110 and/or the ACPI HEST (hardware error source table).

If the machine check status at step 906 is valid, at step 910, the system 100 can generate a notification. The notification can identify the error and request correction. For example, the notification can indicate that an error has occurred and that a software corrective action is required.

At step 912, the system can create a new system event log format for a recovery procedure. At step 914, the system 100 can determine if recovery can be performed through firmware (e.g., firmware 134).

If the recovery is not to be performed through the firmware, the system 100 can move to step 918 to send the system event log. On the other hand, if the recovery is to be performed through the firmware, at step 916, the system 100 can execute the firmware recovery (e.g., UEFI recovery). At step 918, the system 100 can then send the system event log via, for example, the controller 110 and/or ACPI HEST.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

What is claimed is:

1. A method comprising:
   detecting a hardware error associated with a system;
   identifying a system component associated with the hardware error;
   generating, via a baseboard management controller, a sleep state request configured to trigger an operating system of the system to place the system in a particular sleep state, the particular sleep state being determined based on a component type associated with the system component, wherein the particular sleep state comprises:
   a first sleep state when the component type is a peripheral component; and
   a second sleep state when the component type is one of a processor, a memory, or a power supply unit;
   after the system has been placed in the particular sleep state, generating an indication that the system component can be replaced without restarting the operating system of the system, wherein the indication is generated based on a determination that the system is in the particular sleep state corresponding to the component type associated with the system component;
   replacing the system component with a replacement system component without restarting the operating s stem of the system; and
   re-deploying an application associated with the system component that is running on the system, or reconfiguring hardware settings on the system associated with the system component;
   wherein the system is not based on a hot-plug design, and wherein replacing the system component is performed without use of a hot add or hot remove component on the system.

2. The method of claim 1, further comprising determining at least one of a severity of the hardware error, an error count of the hardware error, and a location of the hardware error, wherein the sleep state request is generated when the severity indicates that the hardware error is unrecoverable or the error count exceeds a threshold and wherein the particular sleep state is based on the location of the hardware error.

3. The method of claim 1, wherein the system component comprises at least one of a peripheral component, a second processor, a second memory, or a second power supply unit and wherein the peripheral component comprises one of a storage component, a peripheral component interconnect component, a peripheral component interconnect express component, and a fan, wherein the second sleep state results in at least one of a lower power resource consumption than the first sleep state and a longer resume latency than the first sleep state.

4. The method of claim 1, further comprising:
collecting hardware information associated with the system component to determine a hardware configuration of the system component; and
determining that the hardware configuration of the system component matches a corresponding hardware configuration of a replacement system component.

5. The method of claim 1, further comprising: after the system component has been replaced with a replacement component, determining whether the replacement component is a compatible replacement by determining whether the compatible replacement comprises:
a same type of system component as the system component;
a same hardware configuration as the system component;
a same firmware or software driver compatibility as the system component; and
a same resource requirement as the system component.

6. The method of claim 1, further comprising:
detecting that the system component has been replaced with a replacement system component; and
determining whether the replacement system component is compatible by:
analyzing hardware component information; and
determining whether the replacement system component is a same component as the system component, wherein the replacement system component is compatible if it is the same component as the system component, and wherein the system component is not compatible if it is not the same component as the system component; and
when the replacement system component is compatible, enable a replacement of the system component with the replacement system component; and
when the replacement system component is not compatible, deny a replacement of the system component with the replacement system component.

7. The method of claim 1, wherein the system comprises a virtual machine manager, the method further comprising:
determining that the hardware error affects a resource used by one or more virtual machines associated with the virtual machine manager;
isolating the resource from a pool of resources associated with the virtual machine manager; and
re-allocating a new resource to the one or more virtual machines.

8. The method of claim 1, wherein detecting the hardware error associated with the system comprises receiving, by the baseboard management controller from a system firmware component, a notification of the hardware error based on an error report transmitted by the system component via a service interrupt.

9. A system comprising:
a processor; and
a computer-readable storage medium having stored therein instructions which, when executed by the processor, cause the processor to perform operations comprising:
detecting a hardware error associated with the system;
identifying a system component associated with the hardware error;
generating a sleep state request configured to trigger an operating system of the system to place the system in a particular sleep state, the particular sleep state being determined based on a component type associated with the system component, wherein the particular sleep state comprises:
a first sleep state when the component type is a peripheral component; and
a second sleep state when the component type is one of a processor, a memory, or a power supply unit;
after the system has been placed in the particular sleep state, generating an indication that the system component can be replaced without restarting the operating system of the system, wherein the indication is generated based on a determination that the system is in the particular sleep state corresponding to the component type associated with the system component;
replacing the system component with a replacement system component without restarting the operating system of the system; and
re-deploying an application associated with the system component that is running on the system, or reconfiguring hardware settings on the system associated with the system component;
wherein the system is not based on a hot-plug design, and wherein replacing the system component is performed without use of a hot add or hot remove component on the system.

10. The system of claim 9, the operations further comprising determining at least one of a severity of the hardware error, an error count of the hardware error, and a location of the hardware error, wherein the sleep state request is generated when the severity indicates that the hardware error is unrecoverable or the error count exceeds a threshold and wherein the particular sleep state is based on the location of the hardware error.

11. The system of claim of claim 9, wherein the second sleep state results in at least one of a lower power resource consumption than the first sleep state and a longer resume latency than the first sleep state.

12. The system of claim of claim 9, the operations further comprising:
collecting hardware information associated with the system component to determine a hardware configuration of the system component; and
determining that the hardware configuration of the system component matches a corresponding hardware configuration of a replacement system component.

13. The system of claim 9, the operations further comprising: after the system component has been replaced with a replacement component, determining whether the replacement component is a compatible replacement for the system component, and enabling the system component to be replaced with the replacement component when the replacement component is determined to be the compatible replacement, wherein the replacement component is determined to be the compatible replacement by determining whether the replacement component comprises:
a same type of system component as the system component;
a same hardware configuration as the system component;
a same firmware or software driver compatibility as the system component; and
a same resource requirement as the system component.

14. The system of claim 9, the operations further comprising:
   detecting that the system component has been replaced with a replacement system component; and
   determining whether the replacement system component is compatible by:
   analyzing hardware component information;
   determining whether the replacement system component is a same component as the system component, wherein the replacement system component is compatible if it is the same component as the system component, and wherein the system component is not compatible if it is not the same component as the system component;
   when the replacement system component is compatible, enable a replacement of the system component with the replacement system component; and
   when the replacement system component is not compatible, deny a replacement of the system component with the replacement system component.

15. A computer-readable storage device having stored therein instructions which, when executed by a processor, cause the processor to perform operations comprising:
   detecting a hardware error associated with a system;
   identifying a system component associated with the hardware error;
   generating a sleep state request configured to trigger an operating system of the system to place the system in a particular sleep state, the particular sleep state being determined based on a component type associated with the system component, wherein the particular sleep state comprises:
   a first sleep state when the component type is a peripheral component; and
   a second sleep state when the component type is one of a processor, a memory, or a power supply unit, wherein the second sleep state results in at least one of a lower power resource consumption than the first sleep state and a longer resume latency than the first sleep state; and
   after the system has been placed in the particular sleep state, generating an indication that the system component can be replaced without restarting the operating system of the system, wherein the indication is generated based on a determination that the system is in the particular sleep state corresponding to the component type associated with the system component;
   replacing the s stem component with a replacement s stem component without restarting the operating system of the system; and
   re-deploying an application associated with the system component that is running on the system, or reconfiguring hardware settings on the system associated with the system component;
   wherein the system is not based on a hot-plug design, and wherein replacing the system component is performed without use of a hot add or hot remove component on the system.

16. The computer-readable storage device of claim 15, the operations further comprising determining at least one of a severity of the hardware error, an error count of the hardware error, and a location of the hardware error, wherein the sleep state request is generated when the severity indicates that the hardware error is unrecoverable or the error count exceeds a threshold and wherein the particular sleep state is based on the location of the hardware error.

17. The computer-readable storage device of claim 15, wherein the system component comprises at least one of a peripheral component, a second processor, a second memory, or a second power supply unit, and wherein the peripheral component comprises one of a storage component, a peripheral component interconnect component, a peripheral component interconnect express component, and a fan.

18. The computer-readable storage device of claim 15, the operations further comprising: collecting hardware information associated with the system component to determine a hardware configuration of the system component; and
   determining that the hardware configuration of the system component matches a corresponding hardware configuration of a replacement system component.

* * * * *